(12) United States Patent
Nonogaki

(10) Patent No.: US 10,198,082 B2
(45) Date of Patent: Feb. 5, 2019

(54) POSITION INPUT DEVICE AND POSITION INPUT METHOD

(71) Applicant: KABUSHIKI KAISHA TOSHIBA, Tokyo (JP)

(72) Inventor: Nobuhiro Nonogaki, Taito Tokyo (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 204 days.

(21) Appl. No.: 15/061,971

(22) Filed: Mar. 4, 2016

(65) Prior Publication Data

US 2017/0031450 A1 Feb. 2, 2017

(30) Foreign Application Priority Data

Jul. 31, 2015 (JP) ................................. 2015-152302

(51) Int. Cl.
*G06F 3/01* (2006.01)

(52) U.S. Cl.
CPC .............. *G06F 3/017* (2013.01); *G06F 3/012* (2013.01)

(58) Field of Classification Search
CPC ................................. G06F 3/012; G06F 3/017
USPC ......................................... 382/153; 345/156
See application file for complete search history.

(56) References Cited

U.S. PATENT DOCUMENTS

| | | | |
|---|---|---|---|
| 7,460,687 B2 | 12/2008 | Yokoyama | |
| 2010/0302145 A1* | 12/2010 | Langridge | ............... G06F 3/011 345/157 |
| 2012/0056989 A1 | 3/2012 | Izumi | |
| 2013/0002551 A1* | 1/2013 | Imoto | ..................... G06F 3/013 345/158 |
| 2014/0184494 A1 | 7/2014 | Burachas | |

FOREIGN PATENT DOCUMENTS

| | | |
|---|---|---|
| JP | 2002-259989 A | 9/2002 |
| JP | 2003-076488 A | 3/2003 |
| JP | 2006277666 A | 10/2006 |

(Continued)

OTHER PUBLICATIONS

Tanaka Koichi et al., Analyzing finger pointing behavior through 3D human shape model, 12 pages, May 9, 2002.

(Continued)

*Primary Examiner* — Roy P Rabindranath
(74) *Attorney, Agent, or Firm* — Patterson & Sheridan, LLP

(57) ABSTRACT

A position input device includes a coordinate system setting unit that uses position and orientation of the head of an operator in a first coordinate system to set a second coordinate system in a space including the operator, where a position on the face of the operator is designated as an origin, a transformation matrix calculation unit that calculates a transformation matrix from the first to the second coordinate system, a transformation matrix update unit that updates the transformation matrix according to a result obtained by transforming a coordinate indicating a position of the fingertip of the operator in the first coordinate system with the transformation matrix, and an indication straight line calculation unit that calculates a straight line passing through the origin of the second coordinate system and the position of the fingertip based on the transformation matrix and the position of the fingertip in the first coordinate system.

17 Claims, 5 Drawing Sheets

(56) References Cited

FOREIGN PATENT DOCUMENTS

| | | |
|---|---|---|
| JP | 2009-151419 A | 7/2009 |
| JP | 2012-022632 A | 2/2012 |

OTHER PUBLICATIONS

Japanese Office Action dated Jul. 10, 2018, filed in Japanese counterpart Application No. 2015-152302, 6 pages (with translation).

* cited by examiner

POSITION INPUT DEVICE AND POSITION INPUT METHOD

CROSS-REFERENCE TO RELATED APPLICATION

This application is based upon and claims the benefit of priority from Japanese Patent Application No. 2015-152302, filed Jul. 31, 2015, the entire contents of which are incorporated herein by reference.

FIELD

An embodiment of the present invention relates to a position input device and a position input method.

BACKGROUND

A non-contact type position input device that detects a position pointed at by an operator in connection with an input operation by the operator is known. It is desired that the position input device can accurately detect the position pointed at by the operator so as to accurately characterize the input operation. It is also desired that the position input device suppress deterioration of operability which may result from sensing or detecting of movement that is not associated with an input operation by the operator.

DETAILED DESCRIPTION

Embodiments provide a position input device and a position input method capable of enabling accurate position input while achieving good operability.

In general, according to one embodiment, a position input device includes a coordinate system setting unit that uses a position and an orientation of the head of an operator in a first coordinate system to set a second coordinate system in a space including the operator, wherein a position on the face of the operator is designated as an origin, a transformation matrix calculation unit that calculates and stores a transformation matrix from the first second coordinate system to the second coordinate system, a transformation matrix update unit that updates the stores transformation matrix according to a result obtained by transforming a coordinate indicating a position of the fingertip of the operator in the first coordinate system with the stores transformation matrix, and an indication straight line calculation unit that calculates a straight line passing through the origin of the second coordinate system and the position of the fingertip based on the stores transformation matrix and the position of the fingertip in the first coordinate system.

A position input device and a position input method according to an embodiment will now be described in detail with reference to the accompanying drawings. Note that the present invention is not limited by the embodiments disclosed herein.

Embodiment

Figure 1:
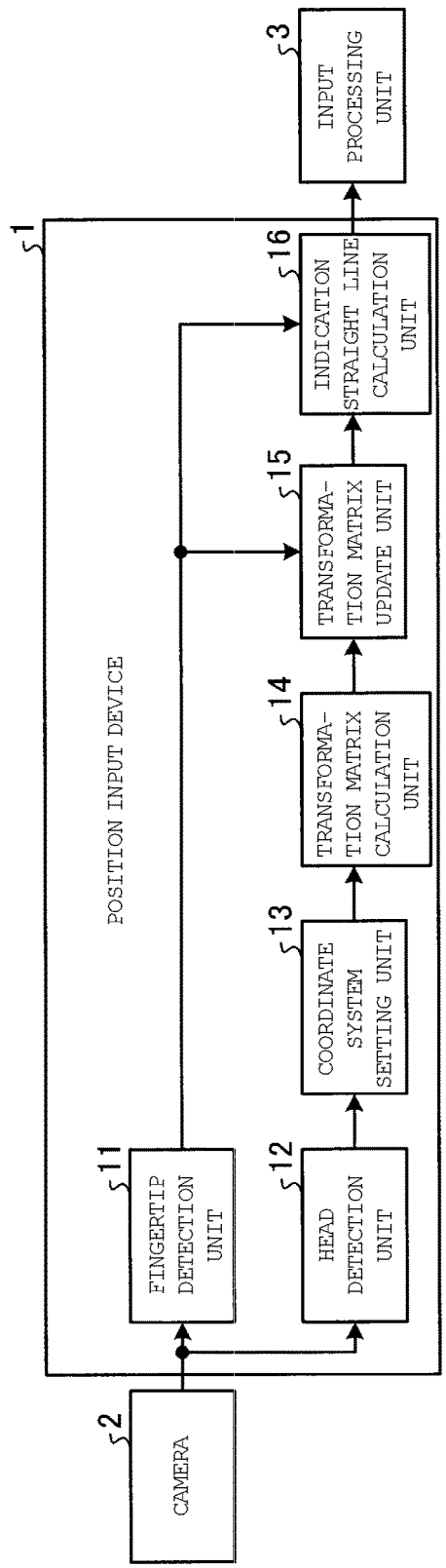
FIG. 1 is a block diagram of a system including a position input device according to an embodiment.

FIG. 1 is a block diagram of a system including a position input device according to an embodiment. The system includes a position input device 1, a camera 2 and an input processing unit 3.

The position input device 1 is configured as a non-contact type pointing device. The position input device 1 detects a position pointed at by an operator based on the gesture of the operator pointing at space with his/her fingertip. The position input device 1 performs such position detection according to a signal that is input from the camera 2 to accept the input operation by the operator.

The camera 2 acquires an image of the operator who is a subject. For example, the camera 2 is a digital camera. The camera 2 detects light from the subject and generates an image signal. For example, the camera 2 forms a visible image according to the intensity distribution of the visible light. In addition to a visible image, the camera 2 may generate any of a thermal image according to the intensity distribution of infrared light, a range image according to the distance distribution from the camera 2 and the like. The camera 2 outputs the generated image signal.

For example, a display device (not shown) displays a virtual operation screen representing the space at the front of the operator. The operator performs an input operation by pointing at an icon or the like displayed on the virtual operation screen. The input processing unit 3 recognizes the icon or the like pointed at by the operator based on the result of the position detection by the position input device 1. The input processing unit 3 grasps the contents of the input operation by the operator, and sends, for example, an instruction corresponding to the input operation to external equipment as an operation target.

A position input program for realizing the position input method described in the embodiment is installed in a personal computer such as hardware. The personal computer includes a central processing unit, a storage device and an input/output interface. The hardware in which the position input program is installed serves as the position input device 1. In the position input device 1 shown in FIG. 1, functions of the position input program are shown as function blocks. Each function is implemented using the central processing unit and the storage device.

The position input device 1 includes respective function portions of a fingertip detection unit 11, a head detection unit 12, a coordinate system setting unit 13, a transformation matrix calculation unit 14, a transformation matrix update unit 15 and an indication straight line calculation unit 16.

The fingertip detection unit 11 detects the position of the fingertip of the operator. The head detection unit 12 detects the position and orientation of the head of the operator. The fingertip detection unit 11 and the head detection unit 12 each perform position detection relative to the camera coordinate system that is the first coordinate system based on an image signal from the camera 2. The camera coordinate system is set principally based on the camera 2, and is defined according to the position and orientation of the camera 2 in the space where the camera 2 is installed.

The coordinate system setting unit 13 uses a detection result of the head detection unit 12 to set a face coordinate system that is the second coordinate system. In the face coordinate system, a position on the face of the operator is designated as the origin. The face coordinate system is set principally based on the operator. The transformation matrix calculation unit 14 obtains a transformation matrix from the camera coordinate system to the face coordinate system. A transformation matrix is, for example, an affine matrix for linear transformation.

The transformation matrix update unit 15 stores a transformation matrix. The transformation matrix update unit 15 determines whether to update the stored transformation matrix to a transformation matrix obtained by the transformation matrix calculation unit 14. The transformation matrix update unit 15 determines whether to perform the update based on the calculation result of the transformation matrix of the transformation matrix calculation unit 14 and the detection result of the fingertip detection unit 11. The transformation matrix update unit 15 updates the stored transformation matrix according to the determination result.

The indication straight line calculation unit 16 obtains an indication straight line passing through the origin on the face of the operator and the position of the fingertip. The indication straight line calculation unit 16 obtains an indication straight line based on the transformation matrix stored in the transformation matrix update unit 15 and the detection result of the fingertip detection unit 11. The indication straight line calculation unit 16 outputs a parameter of the obtained indication straight line.

The input processing unit 3 uses a parameter output by the indication straight line calculation unit 16 to obtain an intersection point of the virtual operation screen and the indication straight line. The intersection point represents the position on the virtual operation screen pointed at by the operator. The input processing unit 3 performs processing based on the coordinate of the intersection point.

Figure 2:
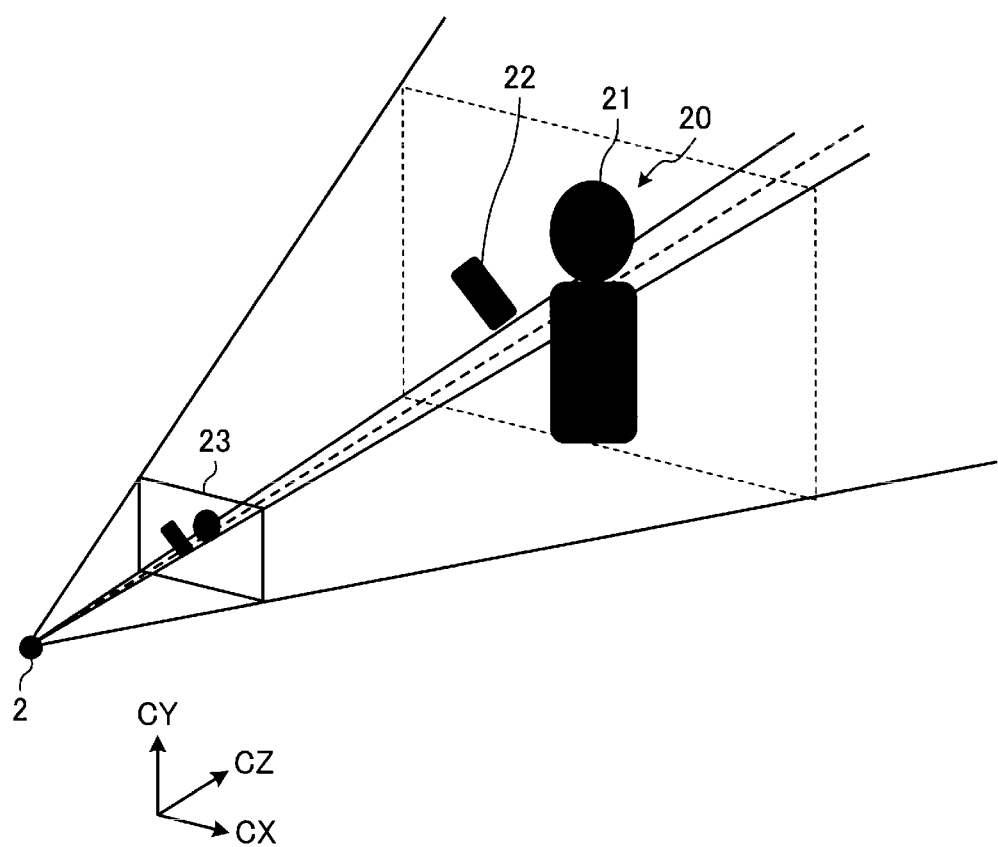
FIG. 2 is a diagram depicting the positional relationship between an image taken by the camera shown in FIG. 1 and an operator.

FIG. 2 is a diagram showing the positional relationship between an image taken by the camera 2 and the operator in the real space. The CX axis, the CY axis and the CZ axis shown in FIG. 2 are three coordinate axes for the camera coordinate system. The CX axis, the CY axis and the CZ axis are perpendicular to one another. The CZ axis is set along the optical axis of the camera 2. As long as the position and orientation of the camera 2 are not changed, the camera coordinate system is fixed in the space where the camera 2 is installed.

The camera 2 takes an image 23 in which the image of the operator 20 in the real space is projected on a CXCY plane. The camera 2 generates a stereoscopic vision image including information about the subject distance in the CZ direction in the image 23. The detail description of the generation of the stereoscopic vision image by the camera 2 will be omitted. The operator performs an input operation at the position where at least a head 21 and a fingertip 22 during operation are included in the scope of the field of view of the camera 2.

Figure 3:
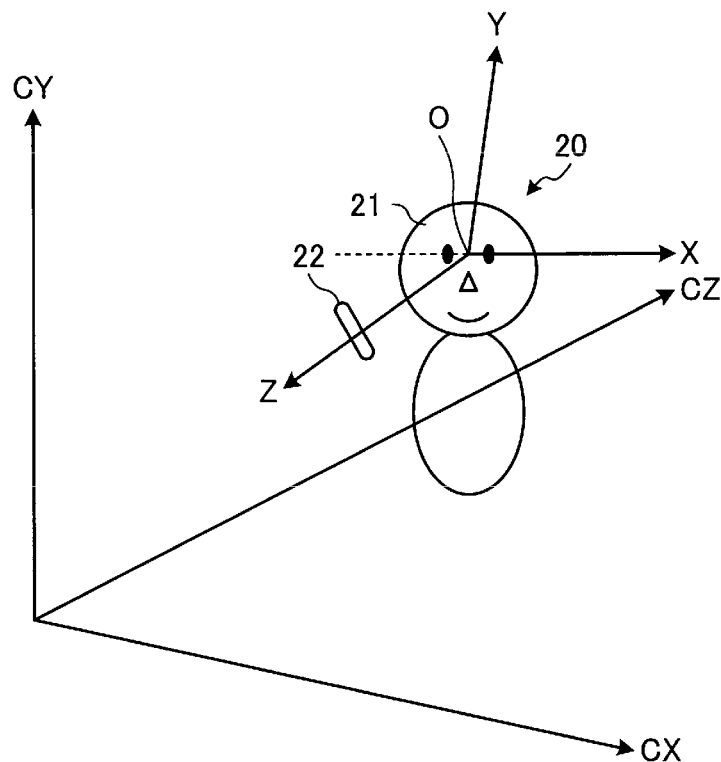
FIG. 3 is a diagram illustrating the setting of a second coordinate system by a coordinate system setting unit shown in FIG. 1.

FIG. 3 is a diagram illustrating the setting of a second coordinate system by the coordinate system setting unit 13. The head detection unit 12 stores information indicating the positions of standard face parts when a human face is viewed from the front. The head detection unit 12 estimates the orientation of the head 21 in the camera coordinate system based on the positional relationship between standard face parts and the face parts taken by the camera 2. The orientation of the head 21 refers to the direction where the face is directed. Further, the head detection unit 12 estimates the position of the head 21 in the camera coordinate system based on the distance between the taken face parts and the camera 2.

The coordinate system setting unit 13 sets a face coordinate system based on the position and orientation of the head 21. The X axis, the Y axis and the Z axis shown in FIG. 3 are three coordinate axes for the face coordinate system. The X axis, the Y axis and the Z axis are perpendicular to one another. The face coordinate system moves according to the change of the position of the head 21 in the space where the operator 20 exists, and rotates according to the change of the orientation of the head 21.

The coordinate system setting unit 13 sets the origin O of the face coordinate system at the middle position of both eyes in the face. In the coordinate system setting unit 13, an axis linking the origin O, the center of the right eye and the center of the left eye is taken as the X axis. In the coordinate system setting unit 13, an axis pointing to the direction where the nose in the face is directed, and perpendicular to the X axis is taken as the Z axis (first axis). The Z axis is set in the anteroposterior direction of the face. In the coordinate system setting unit 13, an axis perpendicular to the X axis and the Z axis is taken as the Y axis.

Note that the face coordinate system is not limited to a coordinate system that is set by the technique described in the present embodiment as long as it is uniquely obtained according to the position and orientation of the head 21. The X axis, the Y axis and the Z axis may be set in the direction other than the direction described in the present embodiment. In the face coordinate system, at least one of the 3 axes should be set in the anteroposterior direction of the face. The X axis, the Y axis and the Z axis may be replaced by one another with respect to the case of the present embodiment.

The fingertip detection unit 11 obtains the coordinate indicating the position of the fingertip 22 in the camera coordinate system when the image of the pointing gesture by the operator 20 is taken by the camera 2, for example.

The transformation matrix calculation unit 14 obtains an affine matrix $A_t$ which represents linear transformation from the camera coordinate system to the face coordinate system. The transformation matrix calculation unit 14 outputs the obtained affine matrix $A_t$ to the transformation matrix update unit 15. To obtain the affine matrix $A_t$, the face coordinate system that is set by the coordinate system setting unit 13 at a given time t is used.

The transformation matrix update unit 15 stores affine matrix A used in the indication straight line calculation unit 16. When it is determined that the update is accepted, the affine matrix A is updated to the affine matrix $A_t$ calculated by the transformation matrix calculation unit 14. Note that the initial value of the affine matrix A stored by the transformation matrix update unit 15 is a given value. The initial value may be an invalid value.

Figure 4:
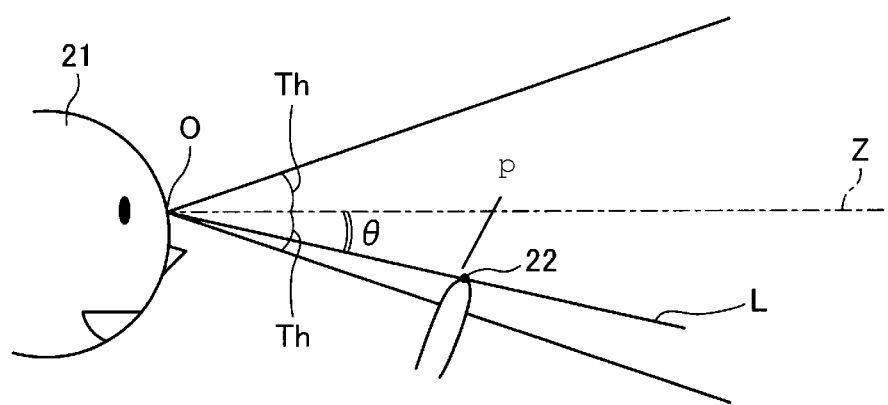
FIG. 4 is a diagram illustrating whether or not a transformation matrix should be updated in a transformation matrix update unit shown in FIG. 1.

FIG. 4 is a diagram illustrating a determination as to whether a transformation matrix should be updated in the transformation matrix update unit 15. The coordinate p indicating the position of the fingertip 22 in the camera coordinate system is input from the fingertip detection unit 11 to the transformation matrix update unit 15. The transformation matrix update unit 15 transforms the coordinate p with the affine matrix $A_t$. Thus, the transformation matrix update unit 15 calculates the coordinate p'=(x0, y0, z0) of the position of the fingertip 22 in the face coordinate system.

An angle θ is formed by a straight line L passing through the origin O and the position of the fingertip 22, and the Z axis. The transformation matrix update unit 15 uses, for example, the following equation (1) to obtain the angle θ.

[Equation 1]

$$\theta = a\cos\frac{z0}{\sqrt{(x0)^2 + (y0)^2 + (z0)^2}} \quad (1)$$

The transformation matrix update unit 15 compares the obtained angle θ with a preset threshold value Th. The transformation matrix update unit 15 determines whether the stored transformation matrix should be updated according to the comparison result.

When the straight line representing the threshold value Th is rotated about the Z axis while intersecting the Z axis at O, the straight line forms a conical side surface shaped trace. Based on the comparison between the angle θ and the threshold value Th, the transformation matrix update unit 15 determines whether the fingertip 22 is nearer the Z axis than the conical side surface.

Figure 5:
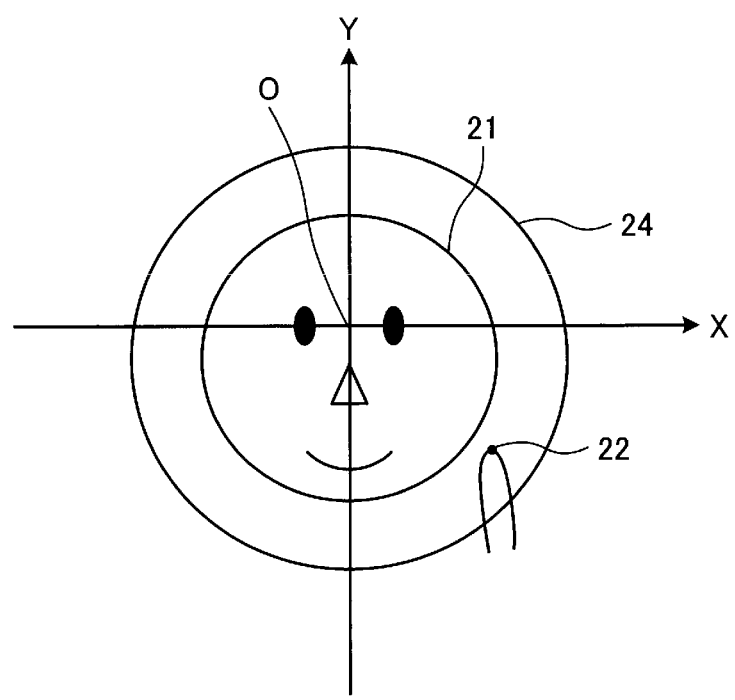
FIG. 5 is a plan view of a space range shown in FIG. 4 when viewed from a location facing the operator.

FIG. 5 is a plan view of a space range shown in FIG. 4 when viewed from the front of the operator. FIG. 5 shows an outer edge 24 of the space range in the XY plane in a position on the Z axis. The outer edge 24 forms a circle around the Z axis. The transformation matrix update unit 15 determines whether the fingertip 22 is present in front of the area where the face of the operator is positioned when the fingertip 22 is inside the outer edge 24.

When the angle θ is less than the threshold value Th (θ<Th), the fingertip 22 is inside the outer edge 24 as Shown in FIGS. 4 and 5. In FIG. 5, the position of the fingertip 22 is present in front of the location where the face of the operator is directed, i.e., where the operator is looking. In this case, the transformation matrix update unit 15 determines that the operator is pointing at a position on the virtual operation screen in the line of sight. Note that an inequality θ<Th represents that the position (x0, y0, z0) is in a range nearer the Z axis than the conical side surface. When θ<Th is satisfied, the transformation matrix update unit 15 updates the stored affine matrix A to the affine matrix $A_t$.

On the other hand, when the angle θ is equal to or larger than the threshold value Th (θ≥Th), the fingertip 22 is on or outside the conical outer edge 24. At this time, the fingertip 22 is in a position not in front of the operator. In this case, the transformation matrix update unit 15 determines that the operator is suspending an input operation while viewing the virtual operation screen. When θ≥Th is satisfied, the transformation matrix update unit 15 does not update the stored affine matrix A. The input affine matrix $A_t$ is not used for the calculation by the indication straight line calculation unit 16 and is excluded from the transformation matrix.

The threshold value Th is set as an angle between 10 and 30 degrees, for example, in view of human viewing angle characteristics. The threshold value Th may be rewritable in response to a setting change operation.

Note that the setting technique of the space range that is the reference of the determination may be changed appropriately without being limited to the scope described in the present embodiment. For example, the outer edge 24 of the space range in the XY plane may be an ellipse and the like having the long axis in the X direction without being limited to a circle around the Z axis.

Figure 6:
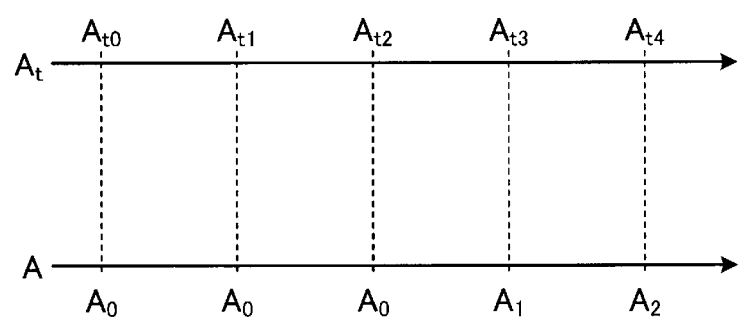
FIG. 6 is a diagram illustrating the relationship between the calculation of the transformation matrix in the transformation matrix calculation unit shown in FIG. 1 and the update of the transformation matrix in the transformation matrix update unit.

FIG. 6 is a diagram illustrating the relation between the calculation timing of the transformation matrix in the transformation matrix calculation unit 14 and the update timing of the transformation matrix in the transformation matrix update unit. The upper side in the figure shows the calculated affine matrix $A_t$ in time series or sequence. Each of $A_{t0}$ to $A_{t4}$ represents the affine matrix $A_t$ calculated at each of time t=t0 to t4. The lower side in the figure shows the transition of the affine matrix A stored in the transformation matrix update unit 15.

In the illustrated example, until the affine matrix $A_{t3}$ calculated at t3 is input, the transformation matrix update unit 15 maintains the stored affine matrix $A_0$. Until t2, the transformation matrix update unit 15 determines to maintain the affine matrix A0 as it is without updating. When the affine matrix $A_{t3}$ is input at t3, the transformation matrix update unit 15 updates the stored affine matrix $A_0$. The transformation matrix update unit 15 stores the affine matrix $A_1$ (=$A_{t3}$) in place of the affine matrix $A_0$ that has been maintained until then.

In this manner, the transformation matrix calculation unit 14 calculates the affine matrix $A_t$ each time the head detection unit 12 periodically monitors the position and orientation of the head 21. When it is determined that update should be performed, the transformation matrix update unit 15 updates the stored affine matrix A to the input affine matrix $A_t$.

The indication straight line calculation unit 16 reads out the affine matrix A. The coordinate p indicating the position of the fingertip 22 in the camera coordinate system is input from the fingertip detection unit 11 to the indication straight line calculation unit 16. The indication straight line calculation unit 16 obtains the coordinate q' which is obtained by projecting in the face coordinate system the coordinate p from the read affine matrix A.

The indication straight line calculation unit 16 uses the inverse matrix $A^{-1}$ of the affine matrix A and the coordinate q' to obtain the indication straight line (x, y, z)=$A^{-1}$q'T. T is a parameter representing a straight line, satisfying T>0. The indication straight line calculation unit 16 outputs $A^{-1}$q' which is a parameter representing the position and inclination of the indication straight line in the space.

If the transformation matrix is updated, the indication straight line calculation unit 16 obtains an indication straight line different from the indication straight line obtained before updating. When it is confirmed that the fingertip 22 is present in front of the operator, the indication straight line calculation unit 16 changes the indication straight line according to the change in the face coordinate system by the movement of the operator. In this case, when the operator moves their head 21 while pointing at the virtual operation screen in front of the operator, the position input device 1 follows the movement of the operator to change the indication straight line. Thus, the position input device 1 can accurately detect the position pointed at by the operator.

If the transformation matrix is not updated, the indication straight line calculation unit 16 obtains the same indication straight line as the previous one. When the fingertip 22 is out of a predetermined space range in front of the operator who is viewing the virtual operation screen, the indication straight line calculation unit 16 does not change the indication straight line even if the face coordinate system is changed by the movement of the operator. This can prevent the position input device 1 from excessively detecting the movement of the operator while the operator is performing movement other than an input operation.

It is assumed that, when the operator moves the head 21 while pointing at the virtual operation screen in front of the operator, the transformation matrix is updated according to the change in the face coordinate system. In that case, the position detected in the position input device 1 is changed despite of no change in the position pointed by the operator. The position input device 1 according to the embodiment can effectively suppress deterioration of operability which may result from sensing or detecting unintentional movement by the operator.

Figure 7:
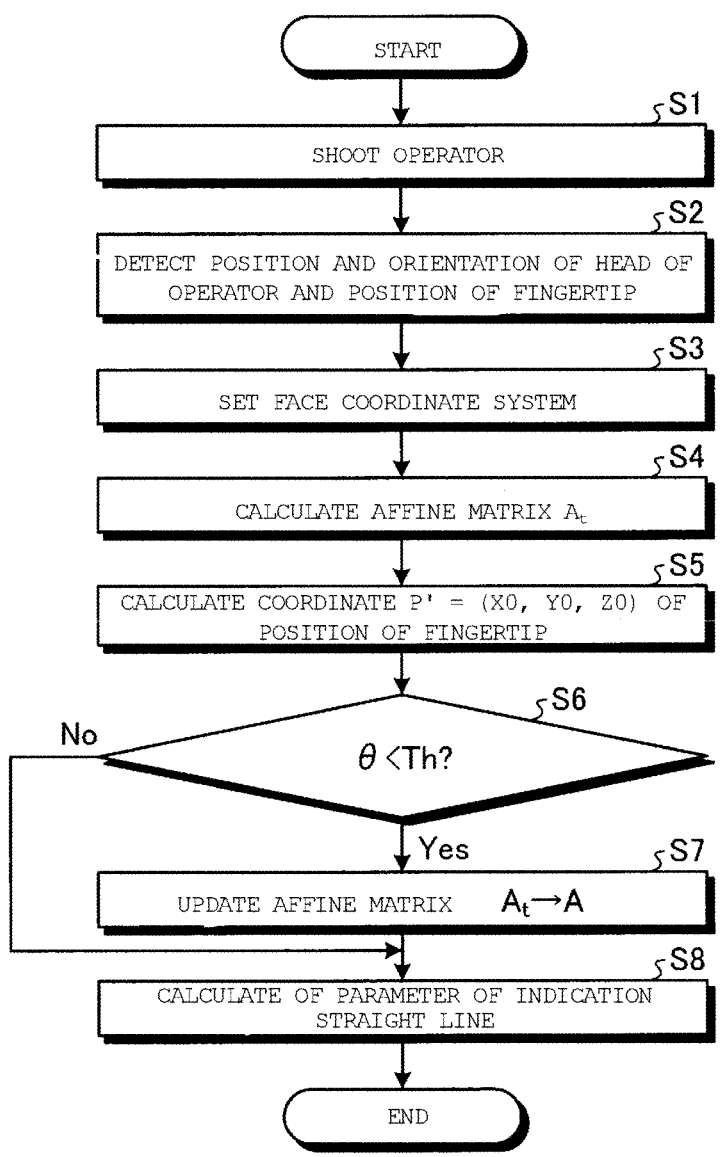
FIG. 7 is a flow chart showing the procedure of a position input method according to the embodiment.

FIG. 7 is a flow chart showing the procedure of a position input method according to the embodiment. The camera 2 shoots, i.e., images, an operator 20 and outputs an image signal (S1). The head detection unit 12 detects the position and the orientation of the head 21 of the operator based on the image signal (S2). Further, the fingertip detection unit 11 detects the position of the fingertip 22 based on the image signal (S2).

The coordinate system setting unit 13 sets a face coordinate system based on the position and the orientation of the head 21 with respect to the operator 20 based on the detection result of the position and the orientation of the head 21 (S3). The transformation matrix calculation unit 14 calculates an affine matrix $A_t$ for transformation from the camera coordinate system to the set face coordinate system (S4).

The transformation matrix update unit 15 uses the calculated affine matrix $A_t$ to transform the coordinate p which is the detection result of the position of the fingertip 22. Thus, the transformation matrix update unit 15 calculates the coordinate p'=(x0, y0, z0) of the position of the fingertip 22 in the face coordinate system (S5).

The transformation matrix update unit 15 determines whether the angle θ is less than the threshold value Th (S6). If the angle θ is less than the threshold Th (S6, Yes), the transformation matrix update unit 15 updates the affine matrix A which has been maintained until then to the affine matrix $A_t$ value calculated in S4 (S7). On the other hand, when the angle θ is equal to or larger than the threshold Th (S6, No), the position input device 1 skips S7 and goes to S8.

The indication straight line calculation unit 16 reads out the affine matrix stored by the transformation matrix update unit 15, and outputs the parameter $A^{-1}q'$ representing the position and inclination of the obtained indication straight line (S8). Thus, the position input device 1 ends the processing in accordance with the input image signal.

Note that, in a system including the position input device 1, external devices other than the position input device 11 may perform the functions of the fingertip detection unit 11 and the head detection unit 12. In this case, the position input device 1 may include an input receiving unit instead of the fingertip detection unit 11 and the head detection unit 12. The input receiving unit receives the input of the detection result of the position of the fingertip 22, and the detection result of the position and the orientation of the head 21 by the external devices. Thus, the position input device 1 may not include the fingertip detection unit 11 and the head detection unit 12.

According to the embodiment, the position input device 1 causes the indication straight line calculation unit 16 to obtain an indication straight line passing through the origin on the face and the position of the fingertip. The position input device 1 can accurately detect the position pointed at by the operator by obtaining an indication straight line based on the positional relationship in the direction of viewing by the operator. The transformation matrix update unit 15 determines whether to update the transformation matrix using a result obtained by transforming the coordinate indicating the position of the fingertip using the transformation matrix obtained in the transformation matrix calculation unit 14. The position input device 1 updates the transformation matrix when the fingertip 22 is present in the predetermined space range in front of the operator, thus it is possible to suppress deterioration of operability which may result from oversensitive detection of movement of the operator. In this manner, the position input device 1 and the position input method can produce effects of enabling accurate position input and attaining good operability.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A position input device comprising:
a processor configured to:
use a position and an orientation of the head of an operator in a first coordinate system to set a second coordinate system in a space including the operator, wherein a position on the face of the operator is designated as an origin;
calculate and store a transformation matrix from the first coordinate system to the second coordinate system;
update the stored transformation matrix according to a result obtained by transforming a coordinate indicating a position of a fingertip of the operator in the first coordinate system with the stored transformation matrix;
calculate a straight line passing through the origin of the second coordinate system and the position of the fingertip based on the stored transformation matrix and the position of the fingertip in the first coordinate system;
set a first coordinate axis for the second coordinate system in an anteroposterior direction of the face; and
update the stored transformation matrix when an angle formed by the calculated straight line and the first coordinate axis is less than a threshold value.

2. The device according to claim 1, wherein the processor is further configured to determine whether the fingertip is within a conical region extending around the first coordinate axis.

3. The device according to claim 2, wherein the conical region is elliptical in cross-section.

4. The device according to claim 1, wherein the calculated straight line is indicative of a location on an operation screen which is pointed at by the operator.

5. The device according to claim 4, wherein the calculated straight line extends from an origin point on the operator's head, past the operator's fingertip, and to the location on the operation screen which is pointed at by the operator.

6. The device according to claim 1, wherein the processor is further configured to detect the position and an orientation of the head of the operator in the first coordinate system.

7. The device according to claim 1, wherein the processor is further configured to detect the position of the fingertip in the first coordinate system.

8. A position input device comprising:
a processor configured to:
use a position and an orientation of the head of an operator in a first coordinate system to set a second coordinate system in a space including the operator, wherein a position on the face of the operator is designated as an origin;
calculate and store a transformation matrix to convert from the first coordinate system to the second coordinate system;
update the stored transformation matrix according to a result obtained by transforming a coordinate indicating a position of an operator pointing portion in the first coordinate system with the stored transformation matrix;
calculate a straight line passing through the origin of the second coordinate system and the position of the operator pointing portion based on the stored transformation matrix and the position of the operator pointing portion in the first coordinate system;
set a first coordinate axis for the second coordinate system in an anteroposterior direction of the face; and
update the stored transformation matrix only when an angle formed by the calculated straight line and the first coordinate axis is less than a threshold value.

9. The device according to claim 8, wherein the calculated straight line is indicative of a location on an operation screen which is pointed at by the operator.

10. The device according to claim 9 wherein the calculated straight line extends from an origin point on the operator's head, past the operator pointing portion, and to the location on an operation screen which is pointed at by the operator.

11. The device according to claim 8, wherein the processor is further configured to detect the position and orientation of the head of the operator in the first coordinate system.

12. The device according to claim 8, wherein the processor is further configured to detect the position of the operator pointing portion in the first coordinate system.

13. The device according to claim 8, wherein the processor is further configured to determine whether the operator pointing portion is within a conical region extending around the first coordinate axis.

14. The device according to claim 13, wherein the conical region is elliptical in cross-section.

15. A position input method including:
using a position and an orientation of the head of an operator in a first coordinate system to set a second coordinate system in a space including the operator wherein a position on the face of the operator is designated as an origin;
calculating a transformation matrix from the first coordinate system to the second coordinate system;
determining whether to update the calculated transformation matrix based on a result obtained by transforming a coordinate indicating a position of a fingertip of the operator in the first coordinate system using the calculated transformation matrix;
updating the calculated transformation matrix according to the determination result;
calculating a straight line passing through the origin of the second coordinate system and the position of the fingertip based on the calculated transformation matrix and the position of the fingertip in the first coordinate system; and
setting a first coordinate axis for the second coordinate system in an anteroposterior direction of the face, wherein
the calculated transformation matrix is updated when an angle formed by the calculated straight line and the first coordinate axis is less than a threshold value.

16. The method according to claim 15, further comprising:
detecting the position and an orientation of the head of the operator in the first coordinate system.

17. The method according to claim 15, further comprising:
detecting the position of the fingertip in the first coordinate system.

* * * * *